(12) United States Patent
Chang et al.

(10) Patent No.: US 8,790,833 B2
(45) Date of Patent: Jul. 29, 2014

(54) FLOATING-TYPE MICROBIAL FUEL CELL

(75) Inventors: In Seop Chang, Gwangju (KR); Junyeong An, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 443 days.

(21) Appl. No.: 12/988,734

(22) PCT Filed: Apr. 23, 2009

(86) PCT No.: PCT/KR2009/002130
§ 371 (c)(1),
(2), (4) Date: Oct. 20, 2010

(87) PCT Pub. No.: WO2009/134035
PCT Pub. Date: Nov. 5, 2009

(65) Prior Publication Data
US 2011/0033757 A1  Feb. 10, 2011

(30) Foreign Application Priority Data
Apr. 30, 2008 (KR) ........................ 10-2008-0040721

(51) Int. Cl.
*H01M 8/16* (2006.01)
(52) U.S. Cl.
USPC ........................................................ 429/401
(58) Field of Classification Search
IPC ....... H01M 8/16, 8/0271, 8/1023, 8/1039; Y02E 60/527
See application file for complete search history.

(56) References Cited

U.S. PATENT DOCUMENTS

| | | | |
|---|---|---|---|
| 2006/0088739 A1* | 4/2006 | Ovshinsky | 429/9 |
| 2006/0118485 A1 | 6/2006 | Gallagher et al. | |
| 2006/0281158 A1* | 12/2006 | Felder et al. | 435/168 |
| 2007/0259216 A1 | 11/2007 | Logan | |
| 2007/0259217 A1 | 11/2007 | Logan | |
| 2008/0090736 A1 | 4/2008 | Zhao et al. | |

FOREIGN PATENT DOCUMENTS

| | | | |
|---|---|---|---|
| JP | 2008-060067 | * | 3/2008 |
| WO | WO 2007006107 | * | 1/2007 |
| WO | WO 2008/036347 | * | 3/2008 |

OTHER PUBLICATIONS

International Search Report from PCT/KR2009/002130 dated Dec. 17, 2009 (2 pages).

* cited by examiner

*Primary Examiner* — Alix Echelmeyer
(74) *Attorney, Agent, or Firm* — Osha Liang LLP

(57) ABSTRACT

Provided is a floating-type microbial fuel cell capable of effectively generating energy from organic contaminants of contaminated waters. The floating-type microbial fuel cell includes a cathode, an anode electrically connected to the cathode, and a floating unit connected to the cathode and/or the anode and floatable in a substrate solution, wherein the cathode is positioned at a region in the substrate solution having a dissolved oxygen concentration higher than that of a region at which the anode is positioned, and the anode is positioned at a region in the substrate solution having an amount of electrons generated by microorganisms larger than that of a region at which the cathode is positioned.

4 Claims, 4 Drawing Sheets

FLOATING-TYPE MICROBIAL FUEL CELL

TECHNICAL FIELD

The present invention relates to a microbial fuel cell, and more particularly, to a floating-type microbial fuel cell.

BACKGROUND ART

A microbial fuel cell (MFC) is a device that converts chemical energy of a substrate as an electron donor into electrical energy using microorganisms as a catalyst.

Meanwhile, most costs for processing contaminated water such as drain water, waste water, etc., are consumed by oxygen aeration and disposal of residual sludge. Since an oxygen aeration system requires electrical energy consumption that increases according to an object to be processed, and aerobic microorganisms constituting a large amount of residual sludge are generated when the contaminated water is processed through the oxygen aeration, costs for processing residual sludge are also increased. In order to solve this problem, research on processing contaminated water using microbial fuel cells is being conducted.

However, since microbial fuel cells are still being researched as a device for use in experiments in laboratories, they must be largely improved to be directly applied to contaminated waters.

DISCLOSURE OF INVENTION

Technical Problem

In order to solve the foregoing and/or other problems, it is an aspect of the present invention to provide a microbial fuel cell capable of effectively generating energy from organic contaminants of contaminated waters.

Additional aspects and advantages of the present invention will be set forth in part in the description which follows and, in part, will be obvious from the description, or may be learned by practice of the invention.

Technical Solution

One aspect of the present invention provides a floating-type microbial fuel cell including: a cathode; an anode electrically connected to the cathode; and a floating unit connected to the cathode and/or the anode and floatable in a substrate solution, wherein the cathode is positioned at a region in the substrate solution having a dissolved oxygen concentration higher than that of a region at which the anode is positioned, and the anode is positioned at a region in the substrate solution having an amount of electrons generated by microorganisms larger than that of a region at which the cathode is positioned.

Another aspect of the present invention provides a floating-type microbial fuel cell including: a floating unit floatable in a substrate solution; a cathode connected to the floating unit to be positioned at a surface layer of the substrate solution; and an anode electrically connected to the cathode and disposed to be submerged in the substrate solution.

In addition, the floating-type microbial fuel cell may further include a reactor having a lower substrate inlet/outlet port disposed in a lower surface thereof and/or a side substrate inlet/outlet port disposed in a lower side portion thereof, and an upper connection hole formed in an upper surface thereof.

The anode may be installed in a lower region of the reactor, and the cathode may be installed on the upper surface of the reactor.

Further, the floating-type microbial fuel cell may further include an ion exchange membrane installed between the anode and the cathode.

Furthermore, when the reactor includes the lower substrate inlet/outlet port, the floating-type microbial fuel cell may further include a gas blocking plate installed under the reactor.

In addition, the side substrate inlet/outlet port may include at least one pair of a side substrate inlet port and a side substrate outlet port, which face each other.

Further, the floating-type microbial fuel cell may further include a battery or a motor electrically connected between the anode and the cathode.

BRIEF DESCRIPTION OF DRAWINGS

These and/or other aspects and advantages of the present invention will become apparent and more readily appreciated from the following description of exemplary embodiments of the invention, taken in conjunction with the accompanying drawings of which.

MODE FOR THE INVENTION

Figure 1:
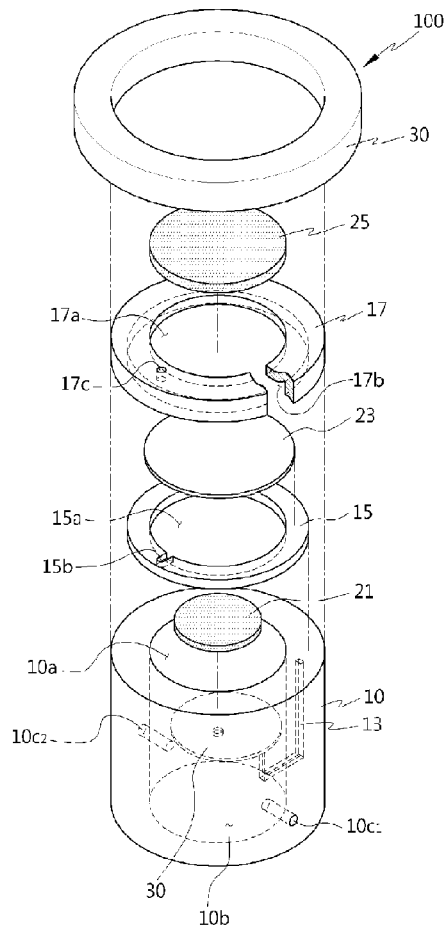
FIG. 1 is an exploded perspective view of a floating-type microbial fuel cell in accordance with an exemplary embodiment of the present invention.

The present invention will be described more fully hereinafter with reference to the accompanying drawings, in which preferred embodiments of the invention are shown. This invention may, however, be embodied in different forms and should not be construed as limited to the embodiments set forth herein. In the drawings, it will be understood that when a specific unit (a first unit) is referred to as being "on" another unit (a second unit), the first unit may be directly on the second unit, or a third unit may be interposed therebetween.

Figure 2:
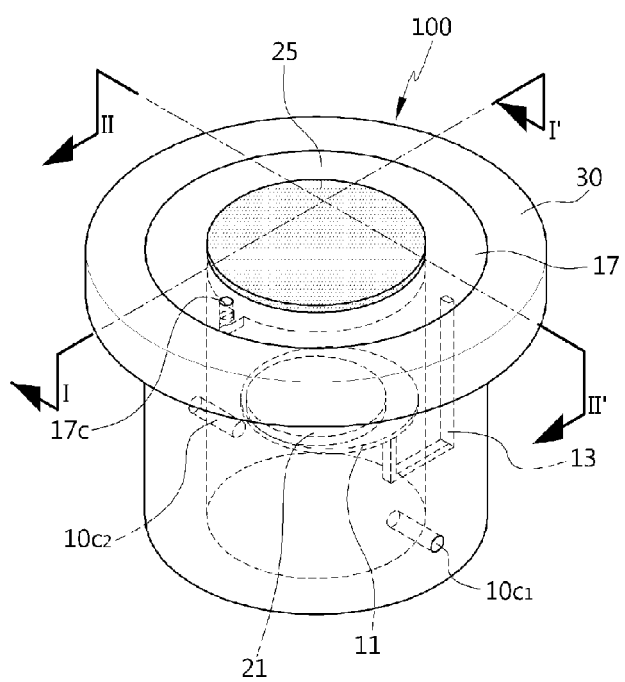
FIG. 2 is a perspective view of the floating-type microbial fuel cell in accordance with an exemplary embodiment of the present invention.
Figure 3:
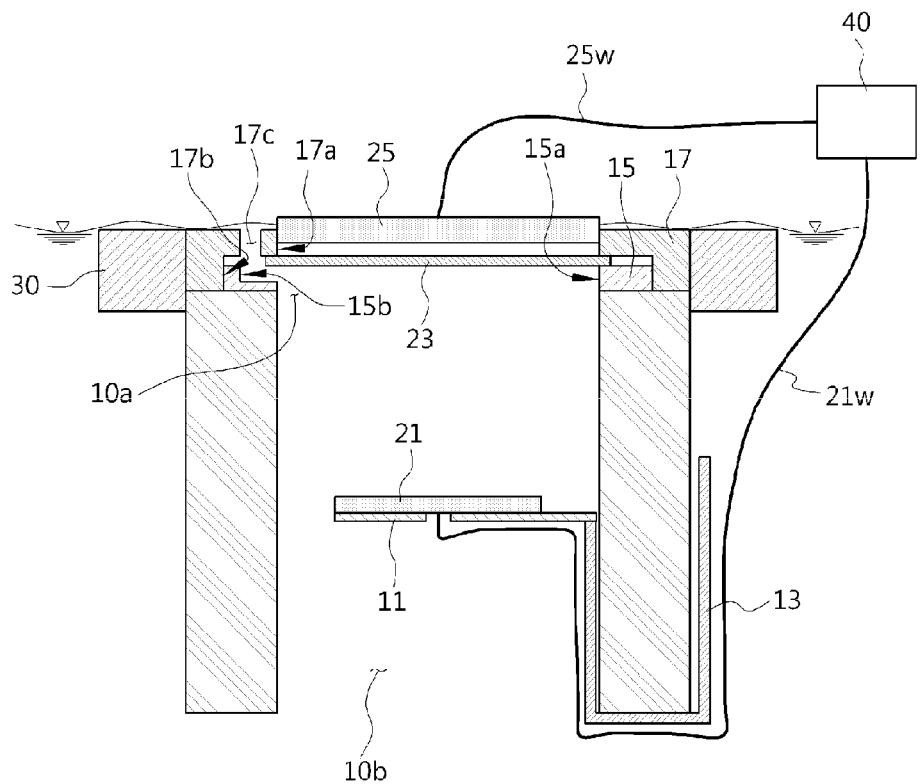
FIG. 3 is a cross-sectional view taken along line I-I' of FIG. 2.
Figure 4:
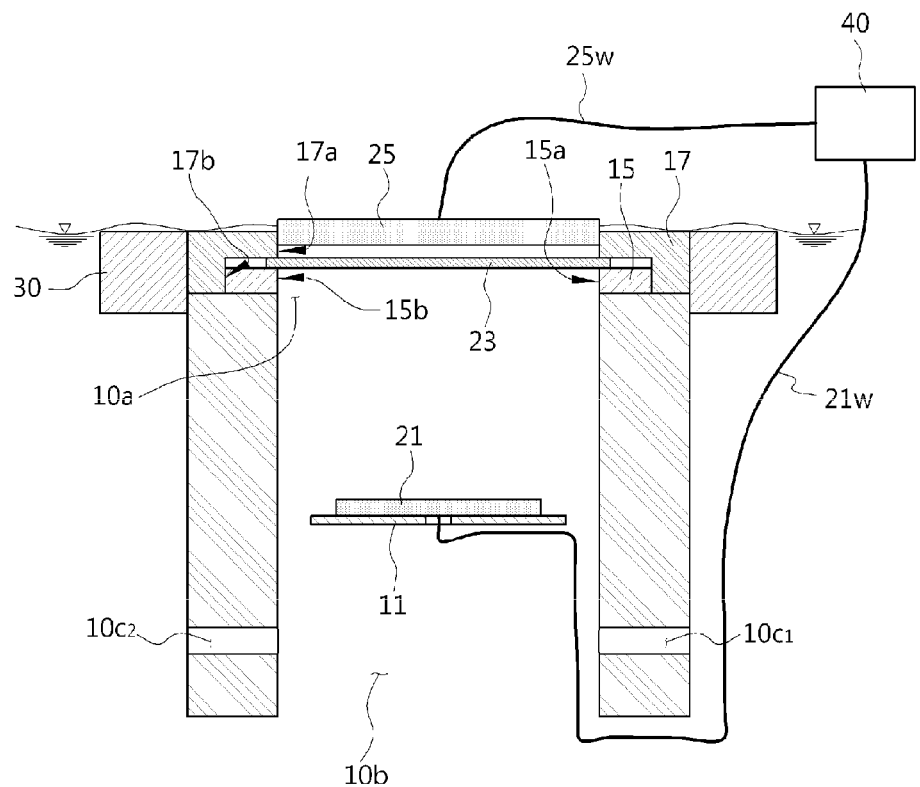
FIG. 4 is a cross-sectional view taken along line II-II' of FIG. 2.

FIGS. 1 and 2 are an exploded perspective view and a perspective view of a floating-type microbial fuel cell in accordance with an exemplary embodiment of the present invention, respectively. FIGS. 3 and 4 are cross-sectional views taken along lines I-I' and II-II' of FIG. 2, respectively.

Referring to FIGS. 1 to 4, while the floating-type microbial fuel cell 100 is shown to include a reactor 10, an embodiment having no reactor 10 is also possible.

First, the embodiment having no reactor will be described. A floating unit floatable in a substrate solution is provided. A cathode is positioned at a region in the substrate solution having a dissolved oxygen concentration higher than that of a region at which an anode is positioned. In addition, the cathode may be coupled to the floating unit to be positioned on a surface layer of the substrate solution. Therefore, the cathode may be exposed to the air and readily contact the dissolved oxygen of the surface layer of the substrate solution.

The anode electrically connected to the cathode is provided. The anode is positioned at a region in the substrate solution having an amount of electrons generated by microorganisms larger than that of a region at which the cathode is positioned. In addition, the anode may be positioned at a region of the substrate solution having a higher organic concentration. Therefore, it is not necessary to artificially supply oxygen and substrate solution to a fuel cell in accordance with an exemplary embodiment of the present invention.

Hereinafter, an embodiment including the reactor 100 will be described. The reactor 10 has a hollow structure. The reactor 10 may have a lower substrate inlet/outlet port 10b disposed in a lower surface thereof, and/or side substrate inlet/outlet ports $10c_1$ and $10c_2$ disposed in a lower side portion thereof. Preferably, at least one pair of side substrate inlet/outlet ports, i.e., a side substrate inlet port $10c_1$ and a side substrate outlet port $10c_2$, are disposed in the lower side portion of the reactor 10 to face each other. When a substrate is introduced through the side substrate inlet port $10c_1$ and the substrate is discharged through the side substrate outlet port $10c_2$, the reactor 10 can more readily move in a substrate solution in a horizontal direction.

The reactor 10 may have an upper connection hole 10a formed in an upper surface thereof. When the reactor 10 has the upper connection hole 10a and the lower substrate inlet/outlet port 10b, the reactor 10 may have a pipe structure.

The reactor 10 may be formed of polyacryl, and further, may be a circular polyacryl pipe.

An anode 21 is installed in a lower region of the reactor 10. The anode 21 may be a carbon electrode or a metal-treated carbon electrode. The carbon electrode may include graphite felt.

The anode 21 may be supported by an anode support frame 11. The anode support frame 11 may be connected to an anode height adjustment unit 13. The anode height adjustment unit 13 may have a "C" shape surrounding a portion of a sidewall of the reactor 10. In this case, when a portion of the anode height adjustment unit 13 disposed at the exterior of the reactor 10 is lowered, the anode support frame 11 is also lowered, and when the portion of the anode height adjustment unit 13 disposed at the exterior of the reactor 10 is raised, the anode support frame 11 is also raised, thereby adjusting a position of the anode 21. However, not being limited thereto, the anode height adjustment unit 13 may have various shapes.

An ion-exchange membrane support frame 15 may be disposed on the reactor 10. The ion-exchange membrane support frame 15 includes a first reaction channel 15a extending from the upper connection hole 10a of the reactor 10. The ion-exchange membrane support frame 15 includes a first vent hole 15b extending from the first reaction channel 15a.

An ion-exchange membrane 23 is disposed on the ion-exchange membrane support frame 15. The ion-exchange membrane 23 may be a positive ion-exchange membrane. As an example, the positive ion-exchange membrane may be a Nafion membrane. The first vent hole 15b is exposed around the ion-exchange membrane 23.

A cathode support frame 17 may be disposed on the reactor 10. Specifically, the cathode support frame 17 may include a receiving portion 17b for receiving the ion-exchange membrane 23 and the ion-exchange membrane support frame 15. The cathode support frame 17 may include a second reaction channel 17a connected to the receiving portion 17b. In addition, the cathode support frame 17 may include a second vent hole 17c connected to the receiving portion 17b.

A cathode 25 may be fixed in the second reaction channel 17a of the cathode support frame 17. The cathode 25 may be a carbon electrode or a metal-treated carbon electrode. Specifically, the carbon electrode may be a carbon electrode treated with one metal selected from the group consisting of platinum (Pt), ruthenium (Ru), osmium (Os), and palladium (Pd). The carbon electrode may include graphite felt.

As described above, the anode 21 is installed in a lower region of the reactor 10 and the cathode 25 is installed in an upper region of the reactor 10 so that the cathode 25 can be disposed on the surface layer of the substrate solution to readily receive oxygen dissolved in the surface layer, and on the other hand, the anode 21 can be disposed in the lower region of the reactor 10 to maintain environments surrounding the anode 21 as an environment which is anaerobic and has high concentration of substrate, i.e., organic contaminants. Therefore, an artificial external substrate supply apparatus and an external oxygen supply apparatus may be omitted. In addition, when dissolved oxygen concentration of the substrate solution surrounding the anode 21 is relatively high or substrate concentration is relatively low, the anode 21 is lowered using the anode height adjustment unit 13 to maintain environments surrounding the anode 21 under an anaerobic environment which is anaerobic and has high substrate concentration.

A floating unit 30 may be installed at an outer periphery of the upper region of the reactor 10. The floating unit 30 may be formed of Styrofoam. The floating unit 30 can float and freely move the fuel cell horizontally in the contaminated water. As a result, the contaminated waters can be naturally purified.

One end of an anode wire 21w and one end of a cathode wire 25w may be electrically connected to the anode 21 and the cathode 25, respectively. The wires 21w and 25w may be copper wires, for example, tin-coated copper wires. In this case, the copper wires may be connected to the electrodes 21 and 25 through platinum wires.

The other end of the anode wire 21w and the other end of the cathode wire 25w may be connected to an electric apparatus 40, for example, a battery and/or a motor. When the electric apparatus 40 is the battery, electricity generated from the microbial fuel cell can be stored. When the electric apparatus 40 is the motor, the motor may be operated using electricity generated from the microbial fuel cell to more readily move the reactor 10 horizontally.

Operation of the floating-type microbial fuel cell in accordance with an exemplary embodiment of the present invention will be described with reference to FIGS. 3 and 4.

Referring to FIGS. 3 and 4, the floating-type microbial fuel cell 100 floats in a substrate solution. The substrate solution may be contaminated water including organic contaminants as a substrate. For example, the contaminated water may be contaminated water in closed waters such as a lake or a water hazard of a golf course, or contaminated water of a sewage treatment plant or a waste water treatment plant. In addition, the organic contaminants may be starch, acetate, lactate, or pyruvate.

The substrate solution may include electrochemically active bacteria (EAB). The EAB oxidizes the organic contaminants in a cell and transmits electrons generated therefrom to the exterior of the cell. The electrons discharged to the exterior of the cell may be transmitted to the anode 21 or transmitted to the anode 21 through reduction and oxidation of an electron acceptor outside the cell. Therefore, there may be no necessity for a mediator that receives electrons in a microbial cell to be reduced and passes a cell membrane to transmit the electrons between a microorganism and an anode. When the mediator is used, since the mediator cannot be perfectly recovered from the microbial cell, the mediator must be continuously replenished to operate the microbial fuel cell. In this case, the mediator is accumulated in the microbial cell, and thus toxicity of the accumulated mediator may stop metabolism of the microorganism. However, in this exemplary embodiment, use of the EAB removes necessity for the mediator and side effects therefrom.

The EAB may be metal salt reducing bacteria. In this case, the microorganism and the metal salt reducing bacteria may be *desulfovibrio vulgaris, geobacter metallireducens, geobacter sulfurreducens*, or *shewanella oneidensis*. The metal salt reducing bacteria may use chrome (VI), uranium (VI), arsenic (V), iron (III), or manganese (IV) as an electron acceptor. Specifically, *desulfovibrio vulgaris* may use lactate as a substrate and use chrome (VI), uranium (VI), or arsenic (V) as an electron acceptor; *geobacter metallireducens* may use acetate or hydrogen as a substrate and use iron (III), manganese (IV), or uranium (VI) as an electron acceptor; *geobacter sulfurreducens* may use acetate as a substrate and use iron (III) or manganese (IV) as an electron acceptor; and *shewanella oneidensis* may use lactate or pyruvate as a substrate and use iron (III), manganese (IV), or uranium (VI) as an electron acceptor.

It has been well known that the EAB can be readily found in anaerobic ecosystem sewage having low oxygen concentration or contaminated water of a wastewater treatment plant (Kim et al., *Journal of Applied Microbiology* 99:978-987; Lee et al., 2003, *FEMS Microbiology Letters* 223:18)-191). In addition, in particular, it is already known that, since the contaminated water of the wastewater treatment plant contains a relatively high concentration of iron, oxidized iron (III) reducing bacteria exist in active sludge of the wastewater treatment plant (Nielsen, et al., 1996, *Water Science and Technology* 34: 129-136).

Reviewing reaction at the anode 21, the EAB oxidizes the substrate, i.e., organic contaminants, and transmits electrons generated therefrom to the exterior of the cell. The electrons discharged from the cell may be transmitted to the anode 21. In addition, the electron acceptor outside the cell may be reduced, and the reduced electron acceptor may be oxidized again at the anode 21 to transmit the electrons to the anode 21. Hydrogen ions may be generated from oxidation of the substrate, or, according to circumstances, carbon dioxide may be generated.

Provided that the substrate is starch, reaction at the starch adjacent to the anode 21 may be represented as follows:

$n(CH_2O)+nH_2O \rightarrow nCO_2+4nH^++4ne^-$  <Chemical Formula 1>

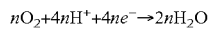

Hydrogen ions generated during oxidation of the substrate passes through the ion-exchange membrane 23 to be transmitted to the cathode 25. Meanwhile, the electrons are transmitted to the anode 21 and the transmitted electrons are transmitted to the cathode 25 via a wire connected to the anode 21. When a battery is connected between the anode 21 and the cathode 25, the electrons may charge the battery; and when a motor is connected thereto, the electrons may rotate the motor.

At this time, since a gas such as carbon dioxide, etc., is discharged to the exterior through the first vent hole 15*b* and the second vent hole 17*c*, the gas is not accumulated under the ion-exchange membrane 23. As a result, since transmission of the hydrogen ions generated during oxidation of the substrate cannot be interrupted, it is possible to increase a voltage generated from the microbial fuel cell.

Oxygen dissolved in the surface layer of the substrate solution may react with the hydrogen at the cathode 25 to generate water. An example of reaction at the cathode 25 may be presented as follows:

$nO_2+4nH^++4ne^- \rightarrow 2nH_2O$  <Chemical Formula 2>

Figure 5:
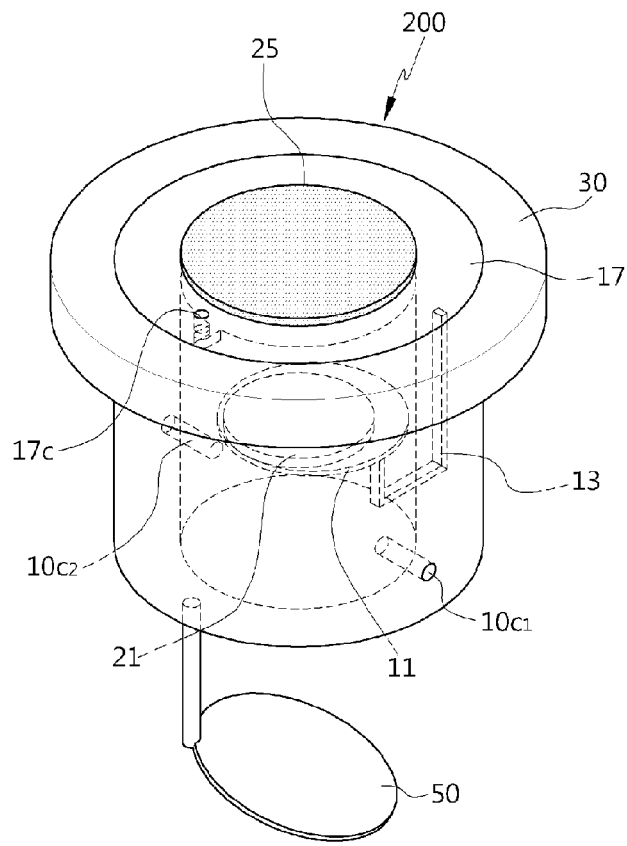
FIG. 5 is a perspective view of a floating-type microbial fuel cell in accordance with another exemplary embodiment of the present invention.

FIG. 5 is a perspective view of a floating-type microbial fuel cell in accordance with another exemplary embodiment of the present invention. The microbial fuel cell in accordance with another exemplary embodiment of the present invention may be similar to the microbial fuel cell described with reference to FIGS. 1 to 4, except for the following description.

Referring to FIG. 5, the floating-type microbial fuel cell 200 may further include a gas blocking plate 50 installed under the reactor 10. The gas blocking plate 50 can prevent the gas generated from the bottom of the substrate solution disposed at a lower portion of the microbial fuel cell 200 from being introduced into the reactor 10. In particular, when the reactor 10 includes a lower substrate inlet/outlet port 10*b* formed in a lower surface thereof, the gas blocking plate 50 may be installed. The gas blocking plate 50 may be installed to be inclined with respect to the lower surface of the reactor 10. The inclination angle may be about 15°.

Figure 6:
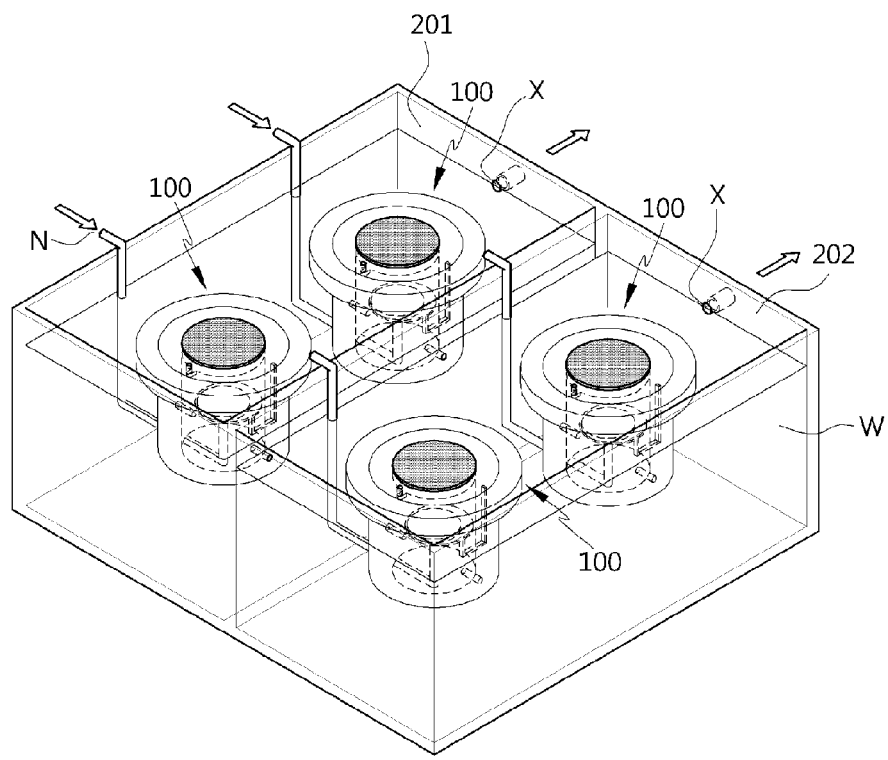
FIG. 6 is a schematic view of an example of closed waters configured using the floating-type microbial fuel cells described with reference to FIGS. 1 to 4.

FIG. 6 is a schematic view of an example of closed waters configured using the floating-type microbial fuel cells described with reference to FIGS. 1 to 4.

Referring to FIG. 6, a plurality of floating-type microbial fuel cells 100 may be installed in a pair of water baths 201 and 202. Specifically, each water bath 201 or 202 may include two floating-type microbial fuel cells 100 installed therein. Supply pipes N may be disposed to supply a substrate solution W into the floating-type fuel cells 100, respectively, and discharge pipes X may be installed at the water baths 201 and 202 to discharge the substrate solution W, respectively.

Hereinafter, examples in accordance with the present invention will be described for the purpose of understanding. The following examples were merely provided for the purpose of understanding, but the present invention is not limited thereto.

<Fabrication Example>

An anode was installed in a lower region of a reactor, a circular polyacryl pipe, using graphite felt having a radius of 2.5 cm and a thickness of 0.6 cm, and a Nafion 450 membrane (Dupont, USA) as an ion-exchange membrane was installed on the reactor. A cathode was installed on the ion-exchange membrane, using graphite felt having a radius of 2.5 cm and a thickness of 0.6 cm. Styrofoam was installed at an upper outer periphery of the reactor. Next, platinum wires were electrically connected to the anode and the cathode, respectively, and tin-plated copper wires were connected to the platinum wires to complete a fuel cell. Meanwhile, slurry in an anaerobic tank and wastewater liquid introduced into the anaerobic tank from the OB Beer Wastewater Treatment Plant of Gwangju, Korea, were collected, and then, the slurry and the wastewater liquid were mixed at a volume ratio of 1:1 and injected into two baths at 10 liters each. Two fuel cells were floated in each bath so that four fuel cells were floated.

<Example>

In order to inoculate EAB, four fuel cells fabricated as in the above example were maintained in an open circuit mode for two days. Then, in order to enrich the EAB, two fuel cells were connected to an external resistor of 10Ω to form a closed circuit mode and then the closed circuit mode was maintained for five days. Next, the fuel cells were operated for two weeks in a state in which artificial wastewater (a chemical oxygen demand of about 640 ppm) containing 10 mM concentration of acetate was uniformly supplied into the bath at a rate of 0.08 ml/min. Then, the fuel cells were operated for four weeks in a state in which artificial wastewater (a chemical oxygen demand of about 3200 ppm) containing 50 mM concentration of acetate was uniformly supplied into the bath at a rate of 0.08 ml/min. During the process, a data acquisition system (Multimeter®, Keithly Instruments, Inc.) connected to a computer measured open circuit voltages from two fuel cells and closed circuit voltages from the other two fuel cells.

Figure 7:
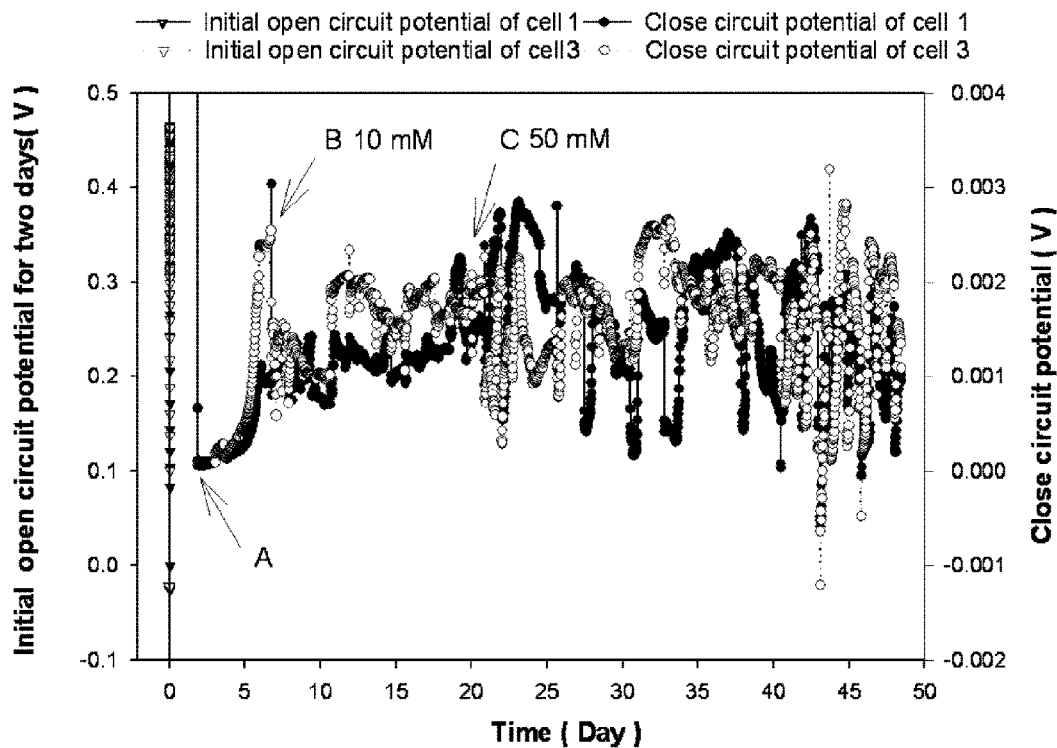
FIG. 7 is a graph showing variations in closed circuit voltage according to time of some fuel cells in an experiment system in accordance with Example.
Figure 8:
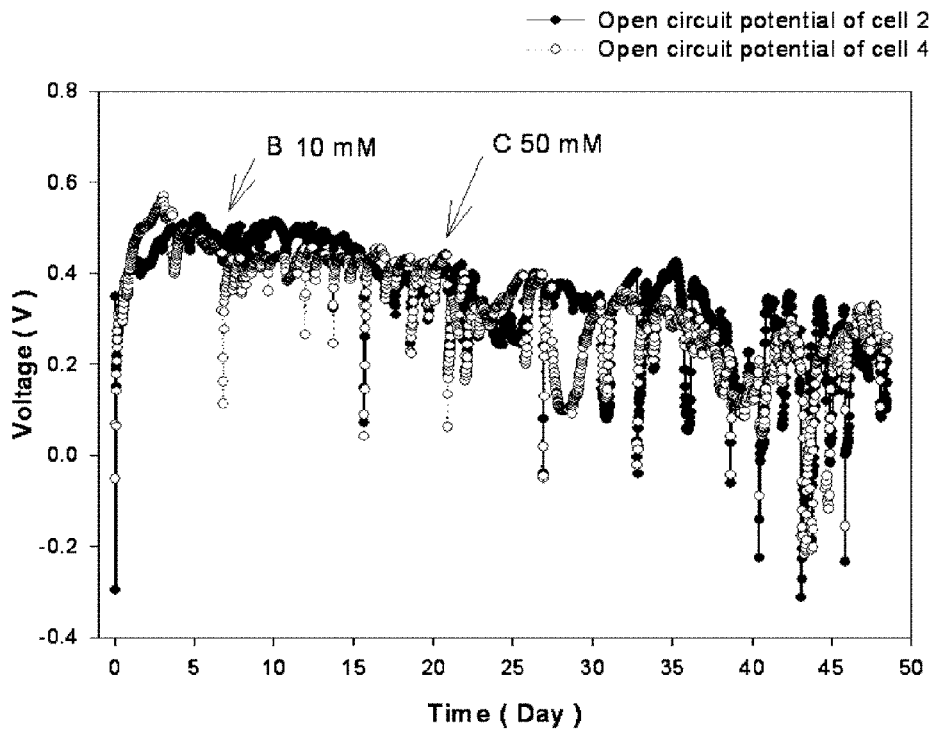
FIG. 8 is a graph showing variations in open circuit voltage according to time of some other fuel cells in an experiment system in accordance with Example.

FIG. 7 is a graph showing variations in closed circuit voltage according to time of some fuel cells in an experiment system in accordance with Example, and FIG. 8 is a graph showing variations in open circuit voltage according to time of some other fuel cells in an experiment system in accordance with Example.

Referring to FIGS. 7 and 8, the open circuit voltage of the fuel cell was increased to 0.5 V or more for two days after inoculation. While the concentration of acetate was increased to 50 mM from 10 mM, the closed circuit voltage was not increased. It was determined that a high concentration of acetate was also diffused into the surface layer of the contaminated water, and aerobic microorganisms consumed oxygen to decompose acetate at the surface layer, thereby reducing the amount of dissolved oxygen in the surface layer. As a result, oxidation reduction potential of a cathode surface solution was decreased and electrode potential of the cathode was simultaneously decreased so that reduction at the cathode was interrupted.

In addition, it was found that the closed circuit voltage was periodically fluctuated after the concentration of acetate was increased to 50 mM from 10 mM. As the closed circuit voltage was fluctuated, when gases generated by the microorganisms of the anode were accumulated under the ion-exchange membrane so that the microbial fuel cell was floated on a water surface, since the cathode contacted a larger amount of oxygen, electrode potential of the cathode was increased, thereby increasing the closed circuit voltage. On the other hand, when the gas layer formed under the ion-exchange membrane was removed, the raised fuel cell was lowered so that the oxidation reduction potential of the water surface was lowered due to supply of 50 mM of acetate as described above, and the electrode potential of the cathode was reduced similarly to the electrode potential of the anode and the closed circuit voltage was rapidly lowered. Therefore, in order to generate a constant closed circuit voltage, the gas can be accumulated under the ion-exchange membrane to prevent vertical movement of the fuel cell and increase buoyancy of the fuel cell to further expose the cathode to the air, thereby producing higher and more stable current. As described in the exemplary embodiment explained with reference to FIGS. 1 to 4, in the case that the vent holes 15b and 17c are formed, when the gases generated under the anode by microorganisms are not accumulated under the ion-exchange membrane and discharged to the exterior through the vent holes 15b and 17c and buoyancy of the floating unit 30 is increased to further expose the cathode to the air, the closed circuit voltage may be increased.

While few exemplary embodiments of the present invention have been shown and described, it will be appreciated by those skilled in the art that various changes may be made to these embodiments without departing from the spirit and scope of the invention as defined by the appended claims and their equivalents.

The invention claimed is:
1. A floating-type microbial fuel cell comprising:
 a reactor having a lower substrate inlet/outlet port disposed in a lower surface thereof and a side substrate inlet/outlet port disposed in a lower side portion thereof, and an upper connection hole formed in an upper surface thereof;
 a cathode installed on the upper surface of the reactor;
 an anode electrically connected to the cathode, and installed in a lower region of the reactor;
 an ion exchange membrane installed between the anode and the cathode;
 a vent hole foci ted for discharging gases generated under the anode by microorganisms to the exterior and not accumulating the gases under the ion-exchange membrane; and
 a floating unit installed at an outer periphery of the reactor and floatable in a substrate solution,
 wherein the cathode is positioned at a region in the substrate solution having a dissolved oxygen concentration higher than that of a region at which the anode is positioned, and the anode is positioned at a region in the substrate solution having an amount of electrons generated by microorganisms larger than that of a region at which the cathode is positioned.

2. The floating-type microbial fuel cell according to claim 1, further comprising a gas blocking plate installed under the reactor, when the reactor comprises the lower substrate inlet/outlet port.

3. The floating-type microbial fuel cell according to claim 1, wherein the side substrate inlet/outlet port comprises at least one pair of a side substrate inlet port and a side substrate outlet port, which face each other.

4. The floating-type microbial fuel cell according to claim 1, further comprising a battery or a motor electrically connected between the anode and the cathode.

* * * * *